United States Patent

Goerlach-Doht et al.

[11] Patent Number: 5,482,634
[45] Date of Patent: Jan. 9, 1996

[54] PURIFICATION OF AQUEOUS REACTION OR WASHING MEDIUM CONTAINING CELLULOSE ETHERS

[75] Inventors: Yvonne M. Goerlach-Doht, Hamburg; Hans P. Schneider; Juergen Hermanns, both of Stade, all of Germany; Ulf H. Haagensen, Nakskov, Denmark

[73] Assignee: The Dow Chemical Company, Midland, Mich.

[21] Appl. No.: 259,319

[22] Filed: Jun. 13, 1994

[30] Foreign Application Priority Data

Jun. 14, 1993 [GB] United Kingdom ............ 9312219

[51] Int. Cl.⁶ ............................................. B01D 61/00
[52] U.S. Cl. ..................... 210/651; 210/653; 210/654; 210/650; 210/781; 536/127; 536/128
[58] Field of Search ........................ 210/651, 650, 210/652, 500.41, 781, 653, 654; 536/85, 98, 84, 91, 127, 128; 162/56, 58, 60, 189, 190

[56] References Cited

U.S. PATENT DOCUMENTS

| | | | |
|---|---|---|---|
| 2,791,584 | 5/1957 | Anderson. | |
| 2,861,038 | 11/1958 | Steinmann et al | 210/651 |
| 4,398,024 | 8/1983 | Bernert et al. | 536/85 |
| 4,672,113 | 6/1987 | Wallisch et al. | 210/650 |
| 5,218,107 | 6/1993 | Schulz | 536/84 |
| 5,244,584 | 9/1993 | Schlieperskoetter | 210/781 |
| 5,360,902 | 11/1994 | Brauer et al. | 210/651 |

FOREIGN PATENT DOCUMENTS

| | | |
|---|---|---|
| 0052337 | 11/1981 | European Pat. Off. . |
| 0545426 | 12/1992 | European Pat. Off. . |
| 9308217 | 4/1993 | WIPO . |

Primary Examiner—Ana M. Fortuna

[57] ABSTRACT

In a process for purifying an aqueous liquid reaction and/or washing medium containing i) hot water-insoluble cellulose ethers and ii) hot water-soluble cellulose ethers and/or macromolecular cellulose ether by-products, in a purification step a) the aqueous medium has a temperature above the gel point of the hot water-insoluble cellulose ether and gelled cellulose ether is separated from the aqueous medium by means of a solid-bowl centrifuge or a plate separator and in a purification step b) the remaining aqueous liquor is treated by ultrafiltration at a concentration ratio of at least 40.

20 Claims, No Drawings

PURIFICATION OF AQUEOUS REACTION OR WASHING MEDIUM CONTAINING CELLULOSE ETHERS

BACKGROUND OF THE INVENTION

The process of the present invention relates to a process for purifying an aqueous reaction and/or washing medium which contains cellulose ethers.

Cellulose ethers are generally produced by reacting cellulose, an alkali metal hydroxide and at least one etherifying agent in an aqueous medium which optionally contains one or more organic solvents. After separation of the produced crude cellulose ether the remaining aqueous reaction medium generally contains various impurities, such as hot water-insoluble cellulose ethers as well as hot water-soluble cellulose ethers and/or macromolecular cellulose ether by-products. The crude cellulose ether is usually washed with hot water and/or steam for purification purposes. After this washing step the washing medium also contains various impurities, such as hot water-insoluble cellulose ethers as well as hot water-soluble cellulose ethers and/or macromolecular cellulose ether by-products. The reaction and/or washing medium is usually purified in a biological water purification plant. Unfortunately, the cellulose ethers are poorly biodegradable and cause various problems in the biological water purification plant, such as foaming, poor settling of the biomass or even flotation and loss of the biomass. Accordingly, it would be desirable to pre-treat at least a portion of the reaction and/or washing medium originating from cellulose ether production before feeding the medium into a biological water purification plant.

U.S. Pat. No. 4,762,113 suggests purification of liquid media which comprise low-, medium- and high- boiling organic by-products and low-, medium- and high boiling, residual, non-reacted organic reaction compounds produced from the preparation of cellulose ethers, an alkali metal hydroxide and at least one etherifying agent in an aqueous medium. The purification is carried out in two steps. First the low-boiling organic by-products of the reaction and residual, non-reacted, low-boiling organic reaction components are separated by distillation. The aqueous distillation residue is treated by ultrafiltration. A polyether sulfone membrane is recommended for the ultrafiltration step. In the ultrafiltration step the aqueous distillation residue is separated into a permeate, having a reduced COD value, and a concentrate which substantially comprises undesirable salts and cellulose constituent. The U.S. patent teaches that the concentration of the concentrate should not be raised to a level which is too high since with increasing concentration the retained amount of compounds accounting for the COD value decreases and practically approaches zero at concentration ratios in the range from about 20 to 27, i.e. the COD values of the permeate approximately re-approach the COD value of the initial waste water. With the ultrafiltration method taught in the U.S. patent it is apparently not possible to achieve higher concentration ratios than about 20 to 27. The U.S. patent teaches that the permeate leaving the ultrafiltration process has a COD value which is reduced by about 20% and is directly fed into the waste-water purifying plant. The concentrate is spray dried and the solid residue of the concentrate can be further processed.

It is known that certain cellulose ethers, such as methyl cellulose ethers, ethyl cellulose ethers, methyl hydroxypropyl cellulose ethers and other known hot-water insoluble cellulose ethers are soluble in cold water. They increase the viscosity of an aqueous medium at low temperatures. An increase in viscosity causes a decrease in the efficiency of the ultrafiltration treatment disclosed in U.S. Pat. No. 4,672,113 due to a decreased flux. Furthermore, the relatively high molecular weight hot water-insoluble cellulose ethers tend to plugging or blocking up of the membrane used for ultrafiltration. An inefficient purification of aqueous media originating from cellulose ether production is very disadvantageous. The worldwide yearly production of cellulose ethers is over 100,000 tons per year. The production on such a large scale results in huge amounts of aqueous reaction and/or washing media which have to be purified. The suggested ultrafiltration method with a maximum concentration ratio of about 20 to 27 still leaves huge amounts of concentrate which have to be dried or disposed of in another way. The drying of such large amounts of concentrate is very expensive and energy-consuming.

In order to increase the efficiency of the ultrafiltration treatment disclosed in U.S. Pat. No. 4,672,113, European patent application EP-A-0,545,426 suggests purification of liquid reaction and/or washing media resulting from the production of hot water-insoluble cellulose ethers by ultrafiltration at a temperature above the flocculation temperature of the cellulose ether, preferably above 40° C. It is recommended to subject the reaction and washing media first to a distillation in order to separate low-boiling organic components from the reaction and washing media first to a distillation in order to separate low-boiling organic components from the reaction and washing media. The aqueous distillation residue is treated by ultrafiltration, preferably by means of a polyether sulfane membrane. The concentrate of the reaction and/or washing media is purified by flocculation of the slowly degradable organic components.

Aqueous solutions of certain cellulose ethers, such as methyl cellulose ethers and hydroxypropyl methyl cellulose ethers, are known to gel upon heating. These gels are reversible in that they are formed upon heating yet will liquify upon cooling. Thermal gelation of these cellulose ether solutions has been known for a long time as "syneresis". U.S. Pat. No. 2,791,594 suggests to form a wet mixture comprising 35 to 2 wt.-%, preferably from 25 to 10 wt.-%, of fibrous cold-water-soluble cellulose ether and from 65 to 98 wt.-%, preferably from 75 to 10 wt.-%, of hot water at a temperature above the gel point of the cellulose ether. The mixture is then cooled below the gel point until the fibrous structure disappears, then the temperature is raised to a point above which syneresis occurs. After syneresis has occurred, water is removed by decanting, centrifuging or other mechanical methods before drying of the cellulose ether is started.

The process disclosed in German Offenlegungsschrift DE-A-41 34 662 (equivalent to WO 93/08217) makes use of the above-discussed syneresis. The German Offenlegungsschrift relates to a method of separating cellulose ethers and other cellulose derivatives from a washing medium which results from the purification of crude cellulose ether. In a first step flocculated cellulose derivative is removed from the washing medium which has been heated to a temperature above the gel point of the cellulose ether. Partial removal of the flocculated cellulose derivative is conducted in a settling tank. Non-settled gelled cellulose derivative is removed by centrifugal separation in a cyclone, preferably a hydrocyclone, or by flotation. In a second step, the remaining solution is cooled to a temperature below the gel point and is subjected to a membrane filtration. In the membrane filtration the volume ratio of concentrate to permeate is from 0.5 to 5, preferably about 1. Ultrafiltration through a poly(vinylidene flouride) (PVDF) membrane is recommended. The obtained concentrate is heated above the gel point, is further concentrated and is recycled to the first step.

Unfortunately, the separation of flocculated cellulose derivative from the washing medium in the manner suggested by German Offenlegungsschrift teaches is time-consuming and inefficient. The settling tank has to be heated in order to avoid that the flocculated cellulose derivative goes into solution at a decreased temperature. Furthermore, settling in the settling tank takes unduly long. Trials by the applicants have further revealed that the percentage of gelled cellulose ether that can be separated from the washing medium by means of a hydrocyclone varies significantly from one batch to the other. The percentage of various methyl cellulose ethers and hydroxypropyl methyl cellulose ethers that can be gelled and separated from the washing medium has been found to vary between from 37% to 97%. Further, the above-mentioned volume ratio of 0.5–5, preferably 1, corresponds to a concentration ratio (volume of membrane feed divided by volume of concentrate) of 1.2 to 3, preferably about 2. A membrane filtration with a such a low concentration ratio leaves huge amounts of concentrate which have to be disposed of or recycled to the production process. German Offenlegungsschrift DE-A-41 34 662 suggests recycling of the concentrate to the settling tank utilized in the first step. The concentrate contains water-soluble cellulose ethers as well as organic and inorganic impurities like salts which substantially affect the quality of the cellulose ether which is flocculated in the first step. Accordingly, the problem of handling the concentrate left after the membrane filtration is still not solved.

Accordingly, one object of the present invention is to find another method for purifying aqueous reaction and/or washing media containing cellulose ethers. A preferred object of the present invention is to find a purification process which includes a membrane filtration step that does not fail at a concentration ratio of about 20 to 27.

SUMMARY OF THE INVENTION

The present invention relates to a process for purifying an aqueous reaction and/or washing medium containing i) a hot water-insoluble cellulose ether and ii) a hot water-soluble cellulose ether and/or macromolecular cellulose ether by-product wherein in a purification step a) the aqueous medium has a temperature above the gel point of the hot water-insoluble cellulose ether and gelled cellulose ether is separated from the aqueous medium by means of a solid-bowl centrifuge or a disk separator and in a purification step b) the remaining aqueous liquor is treated by ultrafiltration at a concentration ratio of at least 40.

Surprisingly, it has been found that in the process of the present invention the aqueous reaction and/or washing medium containing cellulose ethers can be subjected to ultrafiltration at a substantially higher concentration ratio than suggested in U.S. Pat. No. 4,672,113 or German Offenlegungsschrift DE-A-41 34 662.

DETAILED DESCRIPTION OF THE INVENTION

The process of the present invention represents an important stage in a large-scale production process for cellulose ethers. The production of cellulose ethers is well known in the art and for example described in U.S. Pat. Nos. 2,831, 852; 2,949,452; 3,388,082; 4,410,693 and 4,456,751. Well-known nonionic cellulose ethers are for example $C_{1-2}$-alkyl cellulose ethers, such as methyl cellulose ethers, ethyl cellulose ethers, or hydroxy-$C_{2-4}$-alkyl $C_{1-2}$-alkyl cellulose ethers, such as hydroxypropyl methyl cellulose ethers, hydroxypropyl ethyl cellulose ethers, hydroxybutyl methyl cellulose ethers, hydroxyethyl methyl cellulose ethers or hydroxyethyl ethyl cellulose ethers, or hydroxy-$C_{2-4}$-alkyl cellulose ethers, such as hydroxyethyl cellulose ethers, hydroxypropyl cellulose ethers or hydroxybutyl cellulose ethers. The cellulose ethers may contain a lower amount, particularly up to about 25% by weight, of ionic substituents, for example, carboxy-($C_{1-2}$)-alkyl groups, N,N-di($C_{1-3}$)-alkyl-amino($C_{1-4}$)-alkyl groups, phosphonomethyl groups or sulfonoethyl groups. The process of the present invention is particularly useful in the large scale production of methyl cellulose ethers and hydroxypropyl methyl cellulose ethers, although the invention is not limited thereto.

In the preparation of cellulose ethers first cellulose is reacted with an aqueous alkali hydroxide. The alkali cellulose may be reacted with one or more etherifying agents. Useful etherifying agents are for example alkyl halides, such as methyl chloride and/or ethyl chloride, alkylene oxides, such as ethylene oxide, propylene oxide and/or butylene oxide, or dialkyl sulfates, such as dimethyl sulfate and/or diethyl sulfate. The reaction is usually conducted in an aqueous medium which may contain one or more water-miscible solvents, for example alcohols, such as methanol, ethanol, isopropanol or tertiary-butanol; glycols, such as propylene glycol, ethylene glycol or butylene glycol; glycol mono- or diethers, such as the methyl or isopropyl mono- or diethers of said glycols; or chlorinated solvents, such as methylene chloride, or acetone or dimethoxyacetone or mixtures thereof.

After completion of the reaction, the produced crude cellulose ether is separated from the reaction mixture. The crude cellulose ether can be separated from the reaction mixture in a known manner, for example by filtration or centrifugation. The remaining aqueous reaction medium contains residual amounts of hot water-insoluble cellulose ethers as well as hot water-soluble cellulose ethers and/or macromolecular cellulose ether by-products. The crude cellulose ether is usually washed with hot water and/or steam for purification purposes. Methods of washing the crude cellulose ether are known in the art. After this washing step the washing medium contains minor amounts of hot water-insoluble cellulose ethers as well as hot water-soluble cellulose ethers and/or macromolecular cellulose ether by-products.

The aqueous reaction and/or washing medium contains hot water-soluble as well as hot water-insoluble compounds. By the term "hot water-soluble compounds" as used herein are meant compounds which do not have a gel point, even at a temperature of above 80° C. By the term "hot water-insoluble compounds" as used herein are meant compounds which have a gel point (flocculation temperature) in the range of 45° to 75° C.

The hot water-soluble cellulose ether and/or cellulose ether by-product generally is a mixture of cellulose ethers and/or macromolecular cellulose ether by-products of various molecular weights. Exemplary of macromolecular cellulose ether by-products are compounds derived from cellulose, hemicelluloses and fibers of low or uneven substitution, unreacted cellulose, polyethylene glycols, polypropylene glycols and/or their monomethyl ethers. Generally, the hot water-soluble cellulose ether or macromolecular cellulose ether by-product has a weight average molecular weight of from 7,000 to 500,000, typically from 8,000 to 100,000, in most cases from 10,000 to 70,000, as measured by gel permeation chromatography. The concentration of hot water-soluble cellulose ether and/or cellulose ether by-product generally is from 0.01 to 1%, typically from 0.01 to 0.8% and in most cases from 0.01 to 0.6%, by the total weight of the aqueous medium.

The residual hot water-insoluble cellulose ether in the aqueous reaction and/or washing medium generally is also a mixture of cellulose ethers of various molecular weights. Generally, they have a weight average molecular weight of from 10,000 to 2,000,000, typically from 25,000 to 2,000,000, in most cases from 45,000 to 1,900,000, as measured by gel permeation chromatography. The process of the present invention is particularly efficient if the concentration of the hot water-insoluble cellulose ether in the aqueous reaction and/or washing medium is from 0.05 to 1.5%, preferably from 0.1 to 1.2%, more preferably from 0.1 to 0.8%, most preferably from 0.1 to 0.6%, by the total weight of the aqueous medium.

It is to be understood that the aqueous reaction and/or washing medium frequently contains organic and/or inorganic by-products which are neither gelled in step a) nor retained by the ultrafiltration membrane in step b) of the process of the present invention. The amount and type of these by-products depend on the chosen alkylation agents, reaction temperatures etc. Frequent monomeric or oligomeric organic by-products in the cellulose ether production are methanol, ethanol, dimethyl ether and/or diethyl ether in the reactions with methyl chloride or ethyl chloride; (di)ethylene glycol, (di)propylene glycol and/or their ethers in the hydroxyalkylation with alkylene oxides as well as sodium chloride and/or sodium hydroxide. The concentration of such organic and/or inorganic by-products in the aqueous medium is generally not substantially changed by the process of the present invention. The process of the present invention does not relate to the treatment of such by-products.

It has been found that the aqueous reaction and/or washing medium can be subjected to ultrafiltration at a substantially higher concentration ratio than suggested in German Offenlegungsschrift DE-A-41 34 662 or in U.S. Pat. No. 4,672,113, if gelled cellulose ether is separated from the aqueous hot medium by means of a solid-bowl centrifuge or a disk separator. The aqueous raction and/or washing medium has a temperature above the gel point of the hot water-insoluble cellulose ether. In the purification step a) of the process of the present invention hot water-insoluble cellulose ether can be gelled and separated from the aqueous medium to an unexpected degree. In step a) generally at least 85%, typically at least 95%, is most cases even at least 98%, of the weight of the hot water-insoluble cellulose ether can be gelled and separated from the aqueous medium. This very efficient gelling and separation is surprising because in aqueous reaction and/or washing media hot water-insoluble cellulose ethers are normally only present in very small amounts, such as 0.05 to 1.5 percent, by the total weight of the aqueous medium.

In the purification step a) the aqueous medium generally has a temperature of from 40° to 100 ° C., preferably of from 45° to 90° C., more preferably of from 50° to 90° C., provided that the temperature is high enough to cause gelling of the hot water-insoluble cellulose ether. In the preferred practice of the process of the present invention the aqueous reaction medium and/or washing medium which results from the preparation, separation and/or washing of a cellulose ether has a temperature within the above-indicated ranges and does not have to be heated prior to the purification step a). Gelling of the hot water-insoluble cellulose ether generally occurs within 1 to 30 minutes, frequently within 1 to 5 minutes.

The gelled hot water-insoluble cellulose ether is separated from the aqueous medium by means of a solid-bowl centrifuge or a disk separator. The terms "solid-bowl centrifuge" and "disk separator" are known in the art. The basic principles of centrifuges are explained in "Ullmann's Encyclopedia of Industrial Chemistry", Fifth Edition, Volume B2: Unit Operations I, 11-1 to 11–27, Chapter 11 "Centrifuges and Hydrocyclones". Centrifuges are clearly distinct from hydrocyclones. In a centrifuge a rotating body causes rotation of the aqueous medium whereas a hydrocylone does not contain a rotating body. In a hydrocyclone a circumferential speed of an aqueous medium is generated by feeding it under pressure into the hydrocyclone. A great variety of centrifuge designs are known in the art. According to the above-mentioned "Ullmann's Encyclopedia of Industrial Chemistry" centrifuges are classified as i) filter and screen centrifuges, ii) decanting and sedimentation centrifuges (solid-bowl centrifuges) and iii) separators. A large variety of filter and screen centrifuges exists, such as pusher centrifuges, vibrating screen centrifuges, scraper-type centrifuges etc. Sub-classes of separators are iiia) disk separators, iiib) tube separators and iiic) centrifugal extractors.

Applicants have found that, among the large variety of devices which are available for solid-liquid separation, optimal results are achieved in the purification step a) of the present invention by means of a solid-bowl centrifuge or a disk separator.

Solid-bowl centrifuges contain a solid-wall bowl. Useful designs of solid-bowl centrifuges are illustrated in the above-mentioned "Ullmann's Encyclopedia of Industrial Chemistry", Vol. B2, page 11- 6 under the designations classifying decanter, granulate centrifuge, nozzle disk centrifuge, circular-slot disk centrifuge, tube centrifuge or circular compartment centrifuge. The principle of solid-bowl centrifuges is further explained in the mentioned reference, pages 11— 11 to 11–14. In the process of the present invention preferably a solid-bowl overflow centrifuge, also called decanting centrifuge, is used. The solid-bowl centrifuge preferably contains a nozzle or a helical spring conveyer for discharge of the gelled cellulose ether. Most preferably, in the purification step a) a continous design of a solid-bowl overflow centrifuge equipped with a helical conveyer for discharging the gelled cellulose ether is utilized. This preferred centrifuge type is called solid-bowl scroll discharge centrifuge or decanter. Such solid-bowl scroll discharge centrifuges or decanters are commercially available, for example from Siebtechnik GmbH (Germany) ALFA LAVAL (Sweden), Escher-Wyss (Switzerland) or Kloeckner-Humboldt und Deutz (Germany).

Suitable designs and the principle of disk separators are disclosed in the above-mentioned "Ullmann's Encyclopedia of Industrial Chemistry", Vol. B2, pages 11–15 to 11–17. A preferred disk separator is commercially available from ALFA LAVAL (Sweden).

During the separation step a) the temperature of the aqueous medium should not drop below the gel point of the hot water-insoluble cellulose ethers in order to avoid that these cellulose ethers are again dissolved in the aqueous medium. In step a) generally at least 95%, typically even at least 98%, of the weight of the gelled hot water-insoluble cellulose ether is separated from the aqueous medium. The centrifugation step can be conducted continuously or in batches. The separated hot water-insoluble cellulose ethers are a useful product which can be sold or which can be recycled to the cellulose ether production process. Thereby, the yield of a process for producing the cellulose ethers can be increased.

It is known to use solid-bowl centrifuges for purifying cellulose ethers, however, not for purifying aqueous reaction washing media resulting from the production of cellulose ethers. European patent application EP-A-0,052,337 discloses a process wherein a suspension of a cellulose ether is treated in a solid-bowl screen centrifuge. The suspension comprises 8–10 weight percent of the cellulose ether based on the total weight of the suspension. In the solid-bowl screen centrifuge the suspending agent is removed from the suspension, the cellulose ether is purified by means of extraction with water, optionally mixed with a lower alcohol, at a solid:liquid ratio of 1:5 to 1:10 and the cellulose ether is isolated and removed from the centrifuge.

After the separation of gelled hot water-insoluble cellulose ethers from the aqueous medium according to the purification step a), the remaining aqueous liquor contains hot water-soluble cellulose ethers and/or macromolecular cellulose ether by-products as well as minor amounts of hot water-insoluble cellulose ethers which have not been separated from the aqueous medium by step a). Generally, the concentration of the hot water-insoluble cellulose ethers in the remaining aqueous liquor is only from 20 to 600 ppm, typically from 20 to 400 ppm and in many cases even only from 20 to 300 ppm, based on the weight of the liquor. The aqueous liquor generally contains the above-described hot water-soluble cellulose ether and/or macromolecular cellulose ether by-product in an amount of from 0.01 to 1%, typically from 0.01 to 0.8% and in most cases from 0.01 to 0.6%, by the total weight of the aqueous liquor.

The remaining aqueous liquor is treated by ultrafiltration. Preferably, the aqueous liquor is not subjected to an intermediate distillation step between the purification step a) and the ultrafiltration step b). As used herein, the term "ultrafiltration" is meant to describe a separation technique using a membrane device which separates different components that are in solution based on their different molecular dimensions. A permeate (filtrate) is forced to flow through a membrane by applying a pressure greater than the normal osmotic pressure. The concentration of high molecular weight particles that are retained by the membrane is increased in the remaining liquor, called concentrate. The ultrafiltration in the process of the present invention is conducted at a concentration ratio of at least 40, preferably at least 50, more preferably at least 70, most preferably at least 100. The upper limit of the concentration ratio generally is 150, preferably 130, more preferably 120. The term "concentration ratio" means the volume of the aqueous liquor which is fed to the membrane device divided by the volume of the concentrate. Surprisingly high concentration ratios are achieved in the ultrafiltration step in the process of the present invention. The achieved high concentration ratio in the process of the present invention is an essential advantage over the known purification processes discussed above. The higher the concentration ratio is in the ultrafiltration step, the lower is the volume of concentrate which has to be disposed of. Disposal of the concentrate is usually expensive and energy-consuming.

Due to the efficient separation of hot water-insoluble cellulose ether in the purification step a), the aqueous liquor to be subjected to ultrafiltration has a low viscosity, which facilitates the ultrafiltration step and enables a high concentration ratio. Furthermore, plugging of the membrane is substantially reduced, which reduces the time required for cleaning of the membrane material.

Preferably a membrane material is employed in the ultrafiltration step b) which is stable over an extended time period under alkaline conditions, preferably at a pH of 10–13. The aqueous liquor to be subjected to ultrafiltration generally has a pH of 8 to 14, frequently of 10 to 13.

The membrane material can be produced from various polymers, such as a polyimide, a polyether imide, a polyacrylonitrile, or a poly(ether sulfone) of formula I

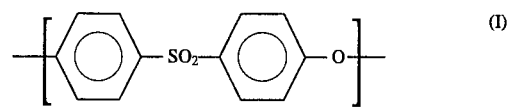

Excellent results are achieved with a membrane produced from cellulose or a cellulose derivative, such as cellulose esters. Preferred cellulose derivatives are cellulose acetate, cellulose triacetate, cellulose tripropionate, ethyl cellulose, cellulose nitrate and mixed esters, such as cellulose acetate-butyrate.

However, in the process of the present invention the most useful ultrafiltration membrane is produced from a polysulfone of formula II.

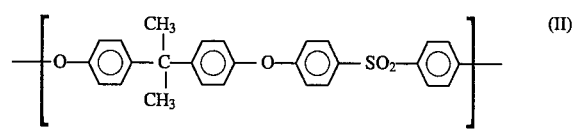

In the practice of the present invention preferably membrane materials are utilized which have molecular weight cut-offs MWCO between 100,000 and 2,000, more preferably about 50,000, most preferably about 20,000. Preferred polysulfone membranes having a MWCO of about 20,000 are commercially available from Dow Danmark A/S, Separation Systems. It has surprisingly been found that in the process of the present invention the ultrafiltration step can be successfully operated with a single MWCO type of membrane, even when the aqueous liquor left after separation of hot water-insoluble cellulose ethers contains hot water-soluble cellulose ethers and/or macromolecular cellulose ether by-products of a wide range of molecular weights. Tests with a polysulfone membrane with a MWCO of 20,000 have shown that the average molecular weight of cellulose ethers and/or macromolecular cellulose ether by-products that pass the membrane to an essential degree is less than 10,000. Tests by the applicants have also shown that cellulose ethers and/or cellulose ether by-products of an average molecular weight of less than 10,000 do not cause significant problems in a biological waste water treatment plant.

Membrane material produced from polytetrafluoroethylene, polyvinylidene fluoride or polypropylene may be used, however their use is less preferred. These membranes are hydrophobic and tend to adsorb dissolved organic materials. The adsorption of organic materials has a negative influence on the flux because the adsorbed layer presents an extra resistance towards mass transfer. In addition, such an adsorption layer is difficult to remove by cleaning methods.

The membrane is usually arranged in a module. Modules of various shapes are commercially available, for example plate and frame, tubular or spiral shaped modules or hollow fibers. Ultrafiltration devices containing one or more membranes in one or more modules are generally known and commercially available. Additionally, an ultrafiltration device usually contains a hydraulic system with pumps to supply the modules with the aqueous liquor under controlled conditions, such as flow and pressure. Furthermore, the ultrafiltration device normally contains a piping system connecting the individual modules and connecting the modules to a supply and/or storage system for the aqueous liquor. Advantageously, the ultrafiltration device contains a system for controlling the temperature and other process parameters. Useful arrangements of ultrafiltration devices are generally known and for example described in U.S. Pat. No. 4,672,113 and by M. Mulder, Basic Principles of Membrane Technology, 1991, Kluwer Academic Publishers. The ultrafiltration can be conducted continuously or in batches in a known manner. In a continuous operation the liquor to be subjected to ultrafiltration is preferably fed to a cascade of ultrafiltration modules, where the concentrate (retentate) of the first module is fed to the second module etc. until the desired concentration ratio is achieved. The permeate (liltrate) of each module can be directly fed into a waste-water purification plant.

The ultrafiltration is generally conducted at a temperature of from 0° to 75° C., preferably from 20° to 75° C., most preferably from 30° to 75° C. Whereas U.S. Pat. No. 4,672,113 teaches conducting the ultrafiltration at a temperature of about 30° to 40° C., in the process of the present invention it can be conducted at higher temperatures, for example between 50° and 75° C. Conducting the ultrafiltration at a higher temperature enables higher flux rates. Higher flux rates allow the usage of smaller membrane areas or a faster ultrafiltration. If the aqueous liquor has a higher temperature than desired for ultrafiltration, it is cooled to the desired operating temperature prior to ultrafiltration. Generally a pressure of from 1 to 10 bar, preferably from 3 to 8 bar, most preferably from 5 to 7 bar is applied. Preferred flux rates of the permeate through the membrane material are from 10 to 100 $l/m^2h$, more preferably from 30 to 75 $l/m^2h$, most preferably from 20 to 65 $l/m^2h$.

The concentration of the hot water-soluble cellulose ethers and/or cellulose ether by-products in the permeate after ultrafiltration depends on various factors, such as their concentration in the aqueous liquor prior to ultrafiltration and the concentration ratio. Generally, their concentration is from 20 to 8,500 ppm, preferably from 50 to 5,000 ppm, most preferably from 100 to 2,000 ppm, by the weight of the permeate. The above-mentioned monomeric or oligomeric organic by-products and inorganic by-products are not enriched in the ultrafiltration, so that they are found in the permeate and in the concentrate from the ultrafiltration process. However, the monomeric or oligomeric organic by-products generally do not cause major problems in a biological waste water purification plant. Therefore, the permeate can be directly fed into a waste-water purification plant. The concentrate may be incinerated or treated by other known methods, such as precipitation etc.

The total concentration of the hot water-insoluble cellulose ether and of the hot water-soluble cellulose ether and/or macromolecular cellulose ether by-product in the aqueous reaction and/or washing medium prior to the process of the present invention generally is from 1,100 to 22,000 ppm, typically from 1,100 to 16,000, in many cases from 1,100 to 12,000 ppm, by the weight of the aqueous medium. The total concentration of the hot water-insoluble cellulose ether and the hot water-soluble cellulose ether and/or macromolecular cellulose ether by-product in the permeate after the process of the present invention generally is from 20 to 8,500 ppm, typically from 50 to 5,000 ppm, in many cases from 100 to 2,000 ppm, by the weight of the permeate. Generally from 60 to 98%, typically from 70 to 95%, in most cases from 80 to 92% of the total concentration of the hot water-insoluble cellulose ether and the hot water-soluble cellulose ether and/or macromolecular cellulose ether by-product are removed from the aqueous reaction and/or washing medium by the process of the present invention.

The process of the present invention is further illustrated by the following examples which should not be construed to limit the scope of the invention. Unless otherwise indicated, all parts and percentages are weight parts and weight percentages. The concentration of the hot water-insoluble and of the hot water-soluble cellulose ethers and of the cellulosic macromolecular by-products are measured photometrically. Macromolecular glycol derivatives are measured by gas chromatography. In the cellulose ether concentrations indicated in the examples below, the amounts of the macromolecular cellulose ether by-products are included. The weight average molecular weights of the macromolecular compounds are measured by gel permeation chromatography. The viscosities of the solutions are measured using an UBBELOHDE viscosimeter at 20° C.

EXAMPLE 1

A hot water-insoluble hydroxypropyl methyl cellulose ether having a hydroxypropoxyl substitution of 4–7.5%, a methoxyl substitution of 27–30% and a weight average molecular weight of 850,000–1,000,000 is produced. The effluent from the production plant contains 3,370 ppm of hot water-insoluble cellulose ether and 530 ppm of hot water-soluble cellulose ether, the total concentration of the cellulose ethers being 3900 ppm. The effluent having a temperature of 65° C. is continuously processed via a solid-bowl scroll discharge centrifuge (decanter) which has a bowl diameter of 420 mm and an acceleration value of 1974 g. About 3.3 kg of gelled hydroxypropyl methyl cellulose ether (calculated as dry product) per $m^3$ of effluent are removed via the solids discharge of the decanter. The removed material is recycled to the cellulose ether production process.

The filtrate leaving the decanter via the liquid discharge has a total cellulose ether concentration of 635 ppm, the weight average molecular weight of the cellulose ethers being 20,260. The residual concentration of hot water-insoluble cellulose ether is 70 ppm. 9.3 $m^3$ of the liltrate are filled into a tank and fed at a feed rate of 7.0 $m^3/h$ to a plate and frame ultrafiltration module equipped with a polysulfone membrane having a MWCO of about 20,000 of an area of 2.25 $m^2$. The ultrafiltration is carried out at a temperature of 50° C. and a pressure of 6.6 bar. The retentate is collected in a separate container and further concentrated by a second ultrafiltration step using the same module configuration. By repeated ultrafiltration of the collected retentate the retentate is first concentrated over 82.5 hours up to a concentration ratio of 15.4 at an average flux of 44 $l/m^2h$. The total cellulose ether concentration in the retentate reaches 6,280 ppm. The average cellulose ether concentration in the permeate is only 200 ppm. The weight average molecular weight of the cellulose ether in the permeate is 6,950. Thus the average cellulose ether concentration in the permeate has been reduced by 94.9%, as compared to the cellulose ether concentration in the production plant effluent.

In a second step the retentate containing 6,280 ppm of cellulose ether of a weight average molecular weight of 18,300 and having a viscosity of only 1.5 mPa.s is further concentrated by means of the same module configuration but equipped with a membrane of an area of 1.35 $m^2$ to a concentration of 1:30. The average flux is 55 $l/m^2h$. In the second step the permeate has a cellulose ether concentration of 446 ppm, the average molecular weight of the cellulose ethers being 7,060. Thus the average cellulose ether concentration in the permeate has been reduced by 88.6%, as compared to the cellulose ether concentration in the production plant effluent. The cellulose ether concentration in the retentate is 10,815 ppm, the average molecular weight of the cellulose ethers being 18,720. The viscosity of the retentate is 2.3 mPa.s.

The retentate concentrated by a ratio of 30 is further concentrated up to concentration ratios of 60 and 90 respectively, using a membrane of an area of 1.35 m$^2$ at average flux rates of 35 l/m$^2$h and 25 l/m$^2$h respectively resulting in average cellulose ether concentrations of 668 ppm (at a weight average molecular weight of 7,770) and of 1,215 ppm (at a weight average molecular weight of 9,080) respectively in the permeate streams. Thus the average cellulose ether concentrations in the permeate streams have been reduced by 82.9% and 68.8%, as compared to the cellulose ether concentration in the production plant effluent. The total cellulose ether concentrations in the retentates are 17,100 ppm and 45,000 ppm respectively, the viscosities of the retentates being 3.8 mPa.s and 6.4 mPa.s respectively.

EXAMPLE 2

A hot water-insoluble hydroxypropyl methyl cellulose ether having a hydroxypropoxyl substitution of 8.5–12%, a methoxyl substitution of 28.5–30.5% and a weight average molecular weight of 90,000–150,000 is produced. The effluent from the production plant contains 540 ppm of hot water-insoluble cellulose ether and 420 ppm of hot water-soluble cellulose ether, the total concentration of the cellulose ethers being 960 ppm. The effluent having a temperature of about 70° C. is fed to a disk separator, commercially available from ALFA LAVAL (Sweden) under the designation CHPX-Separator. The filtrate leaving the disk separator via the liquid discharge has a residual concentration of hot water-insoluble cellulose ether of 5 ppm. This means that 99% of the hot water-insoluble cellulose ether is removed by centrifugation in the disk separator.

EXAMPLE 3

The retentate of Example 1 which has been concentrated up to a concentration ratio of 15.4 and has a total cellulose ether concentration of 6,280 ppm is further concentrated by means of the same module configuration by equipped with a cellulose acetate membrane having a MWCO of about 20,000 with an area of 1.35 m$^2$ to concentration ratios of 60 and 150 respectively at average flux rates of 31 l/m$^2$h and 19 l/m$^2$h respectively resulting in average cellulose ether concentrations of 800 ppm (at a weight average molecular weight of 9,140) and of 1,240 ppm (at a weight average molecular weight of 9,850) respectively in the permeate streams. Thus the average cellulose ether concentrations in the permeate streams have been reduced by 79.5% and 68.2%, as compared to the cellulose ether concentration in the production plant effluent. The total cellulose ether concentrations in the retentates are 19,500 ppm and 70,000 ppm respectively, the viscosities of the retentates being 4.1 mPa.s and 12.1 mPa.s respectively.

What is claimed is:

1. A process for purifying an aqueous reaction after removal of crude cellulose ether and/or washing medium containing i) a hot water-insoluble cellulose ether and ii) a hot water-soluble cellulose ether and/or macromolecular cellulose ether by-product, the process consisting of:

a purification step a) wherein the aqueous medium is heated to or kept at a temperature above the gel point of the hot water-insoluble cellulose ether and gelled cellulose ether is separated from the aqueous medium by means of a solid-bowl centrifuge or a disk separator to leave an aqueous liquor, and a purification step b) wherein the aqueous liquor is treated by ultrafiltration at a concentration ratio of at least 40.

2. The process of claim 1 wherein the aqueous medium contains i) from 0.05 to 1.5% of hot water-insoluble cellulose ether and ii) from 0.01% to 2% of hot water-soluble cellulose ether and/or cellulose ether by-product, by the total weight of the aqueous medium.

3. The process of claim 2 wherein in step a) at least 95% of the weight of the gelled hot-water insoluble cellulose ether i) are removed from the aqueous medium.

4. The process of claim 3 wherein step a) is conducted by means of a solid-bowl scroll discharge centrifuge.

5. The process of claim 4 wherein the ultrafiltration step b) is conducted by means of a polysulfone membrane.

6. The process of claim 5 wherein the aqueous reaction medium results from the preparation of a cellulose ether in an aqueous medium and separation of crude cellulose ether product from the aqueous medium and the aqueous washing medium results from washing of the crude cellulose ether and the aqueous reaction and/or washing medium is subjected to the purification steps a) and b) without intermediate distillation step, wherein in the ultrafiltration step b) the concentration ratio is at least 50 and the total concentration of i) the hot water-insoluble cellulose ether and ii) the hot water-soluble cellulose ether and/or macromolecular cellulose ether by-product in a permeate after the ultrafiltration step b) on the average is up to 20% by weight of the total concentration of compounds i) and ii) in the aqueous reaction and/or washing medium.

7. The process of claim 2 wherein step a) is conducted by means of a solid-bowl scroll discharge centrifuge.

8. The process of claim 2 wherein the concentration ratio in the ultrafiltration step b) is at least 50.

9. The process of claim 2 wherein the total concentration of i) the hot water-insoluble cellulose ether and ii) the hot water-soluble cellulose ether and/or macromolecular cellulose ether by-product in a permeate after the ultrafiltration step b) on the average is up to 20% by weight of the total concentration of compounds i) and ii) in the aqueous reaction and/or washing medium.

10. The process of claim 1 wherein step a) is conducted at a temperature of from 40° to 100° C.

11. The process of claim 1 wherein in step a) at least 95% of the weight of the gelled hot-water insoluble cellulose ether i) are removed from the aqueous medium.

12. The process of claim 1 wherein step a) is conducted by means of a solid-bowl scroll discharge centrifuge.

13. The process of claim 1 wherein the ultrafiltration is conducted at a temperature of from 0° to 75° C.

14. The process of claim 1 wherein the concentration ratio in the ultrafiltration step b) is at least 50.

15. The process of claim 1 wherein the total concentration of i) the hot water-insoluble cellulose ether and ii) the hot water-soluble cellulose ether and/or macromolecular cellulose ether by-product in a permeate after the ultrafiltration step b) on the average is up to 20% by weight of the total concentration of compounds i) and ii) in the aqueous reaction and/or washing medium.

16. The process of claim 1 wherein the aqueous reaction medium results from the preparation of a cellulose ether in an aqueous medium and separation of crude cellulose ether product from the aqueous medium and the aqueous washing medium results from washing of the crude cellulose ether and the aqueous reaction and/or washing medium is subjected to the purification steps a) and b) without intermediate distillation step.

17. A process for purifying an aqueous reaction after removal of crude cellulose ether and/or washing medium containing i) a hot water-insoluble cellulose ether and ii) a hot water-soluble cellulose ether and/or macromolecular cellulose ether by-product, the process consisting of:

a purification step a) wherein the aqueous medium is heated to or kept at a temperature above the gel point of the hot water-insoluble cellulose ether and gelled cellulose ether is separated from the aqueous medium by means of a solid-bowl centrifuge or a disk separator to leave an aqueous liquor, and a purification step b) wherein the aqueous liquor is treated by ultrafiltration a concentration ratio of at least 40 and the ultrafiltration is conducted by means of a polysulfone membrane.

18. The process of claim 17 wherein the concentration ratio in the ultrafiltration step b) is at least 50.

19. The process of claim 18 wherein the total concentration of i) the hot water-insoluble cellulose ether and ii) the hot water-soluble cellulose ether and/or macromolecular cellulose ether by-product in a permeate after the ultrafiltration step b) on the average is up to 20% by weight of the total concentration of compounds i) and ii) in the aqueous reaction and/or washing medium.

20. A process for purifying an aqueous reaction after removal of crude cellulose ether and/or washing medium containing i) from 0.05 % to 1.5 % of hot water-insoluble cellulose ether and ii) from 0.01% to 2 % of hot water-soluble cellulose ether and/or macromolecular cellulose ether by-product, by the total weight of the aqueous composition, the process consisting of:

a purification step a) wherein the aqueous medium is heated to or kept at a temperature above the gel point of the hot water-insoluble cellulose ether and gelled cellulose ether is separated from the aqueous medium by means of a solid-bowl centrifuge or a disk separator to leave an aqueous liquor, and a purification step b) wherein the aqueous liquor is treated by ultrafiltration at a concentration ratio of at least 40 and the ultrafiltration is conducted by means of a polysulfone membrane.

* * * * *